Patented Dec. 13, 1949

2,491,102

UNITED STATES PATENT OFFICE 2,491,102

COATED SHEET MATERIALS AND PLASTIC COMPOSITIONS THEREFOR

Stanley Charles Frowde, Denton, Manchester, England, assignor to Imperial Chemical Industries Limited, a corporation of Great Britain No Drawing. Application May 16, 1945, Serial No. 594,152. In Great Britain April 24, 1944

Section 1, Public Law 690, August 8, 1946
Patent expires April 24, 1964

4 Claims. (Cl. 260—45.5)

The present invention relates to sheet materials, mouldings, pressings, extrusions or other flexible shaped articles comprising a polyvinyl chloride composition having a sufficiently high content of plasticiser to impart to the article the desired degree of flexibility. The invention relates especially to sheet materials comprising a fabric or other porous base material provided with a coating of such a polyvinyl chloride composition. The invention also relates to polyvinyl chloride compositions suitable for the manufacture of flexible shaped articles of the kind described.

In the proofing of fabric it is well known to apply to the fabric paste-like compositions containing polyvinyl chloride and plasticisers, with or without pigments or fillers and then to gelatinise the composition by heating it. Hitherto proofed fabrics so produced have suffered from the defect that the coating composition becomes sticky or tacky at raised temperatures, and consequently difficulty may be found in embossing or like operations. Similar difficulties may be experienced with other shaped articles made from polyvinyl compositions having a sufficient proportion of plasticiser to impart flexibility.

The term "polyvinyl chloride paste" is used herein and in the appended claims to denote a dispersion of finely divided polyvinyl chloride in a liquid medium which is capable of gelatinising the polyvinyl chloride when the said paste is subjected to a raised temperature. The term "polyvinyl chloride" is used herein and in the appended claims to denote not only the product obtained by the polymerisation of vinyl chloride but also interpolymers of vinyl chloride with other polymerisable unsaturated compounds such for example as vinyl acetate or other vinyl esters, acrylic or methacrylic acid esters, or ethyl fumarate or other di-alkyl esters of dibasic unsaturated acids.

In pending British application No. 18,664/43 there is described and claimed a process for the surface coating of sheet material comprising gelatinised polyvinyl chloride according to which a dispersion of polyvinyl chloride powder in a solution of a hard, resinous, transparent, polymerised, unsaturated compound other than polyvinyl chloride with which polyvinyl chloride is compatible in a volatile solvent in which the polyvinyl chloride is insoluble is applied to the gelatinized polyvinyl chloride surface, and the volatile solvent is evaporated. In the process of the said pending application the unsaturated compound may be methyl methacrylate.

I have now found that a simple and efficient method of eliminating the difficulties herein referred to consists in providing a surface layer containing a resinous interpolymer of an acrylic ester and an acrylic amide both as herein defined. If desired the surface layer containing the interpolymer may be provided by applying to the surface of the polyvinyl chloride composition a coating containing the interpolymer. Alternatively however the surface layer containing the interpolymer may be provided by incorporating the interpolymer throughout the polyvinyl chloride composition.

The acrylic ester component of the interpolymer is any alkyl acrylate or substituted acrylate or a mixture thereof, but in particular may be a methacrylate ester of a saturated aliphatic alcohol. The acrylic amide component of the interpolymer is any amide of acrylic acid or substituted acrylic acid or mixture of such and in particular may be methacrylamide.

The sheet material of the present invention has a much reduced stickiness or tackiness at raised temperature and much reduced drag at ordinary temperature. The sheet material is also characterised by improved abrasion resistance and can be roller embossed in the manner described in pending British application No. 4605/44.

Yet further improvements in hardness and temperature resistance of the surface of the articles of the present invention can be obtained by including with the interpolymer a small proportion of formaldehyde or formaldehyde yielding substance. In this form of the invention the interpolymer should contain a proportion of the ester compound sufficient to render it compatible with polyvinyl chloride and a proportion of the amide constituent sufficient to enable advantage to be taken of the cross-linking reaction between the amide groups and the formaldehyde. The interpolymer suitably contains a proportion of the amide compound lying between 2% and 50% by weight. As formaldehyde producing substance there may be used paraform, methylol compounds such for example as dimethylol urea or hexamethylol melamine, or ethers of methylol compounds such for example as the dialkyl ether of dimethylol urea or the hexa-alkyl ethers of hexamethylol melamene. We may, if desired, add a catalyst for the cross-linking reaction, such for example as meta benzene disulphonic acid catalyst.

In carrying out that form of the invention in which the interpolymer is applied to the surface of the polyvinyl compositions we may suitably apply the coating of interpolymer in the form of a lacquer consisting of a solution or dispersion of the interpolymer in a volatile organic solvent. This solution or suspension may if desired also contain formaldehyde or a formaldehyde producing substance and a catalyst for the cross-linking reaction. If desired the lacquer may be applied to the polyvinyl chloride substrate while this latter is still in the ungelatinised state obtained by the drying of a polyvinyl chloride paste. The lacquer is allowed to dry and the substrate gelatinized by the application of radiant heat. When formaldehyde is included in the lacquer the application of radiant heat to gelatinise the substrate simultaneously brings about the cross-linking reaction.

In that form of the invention in which the interpolymer is incorporated throughout the polyvinyl chloride composition, the interpolymer in finely divided solid form may if desired be mixed directly with the paste or the interpolymer may firstly be dissolved or dispersed in a volatile organic solvent. The paste may be applied to a fabric or other sheet material, dried and gelatinised in known manner and when formaldehyde is included in the paste in accordance with the preferred form of the invention, the application of heat for the purpose of gelatinising the paste brings about the desired cross-linking reaction.

The invention is illustrated but not limited by the following examples.

Example 1

A paste-like composition is produced by incorporating the following ingredients at ordinary temperature in a paddle mixer for ½ hour.

| | Parts by weight |
|---|---|
| Polyvinyl chloride | 1.0 |
| Tricresylphosphate | 1.0 |
| Iron oxide (pigment) | 1.0 |
| Interpolymer of methacrylamide 10%—methyl acrylate 90% | 0.25 |
| Benzene/alcohol (equal parts by volume) | 1.0 |
| Paraform | 0.005 |
| m-Benzene disulphonic acid | Trace |

This paste-like composition was applied to a textile fabric base in a spreading machine and the solvent evaporated by drying for three minutes at a temperature of 90° C. The dried coating was subsequently gelatinised and hardened by subjecting to a source of radiant heat consuming 2 kilowatts electrical energy per sq. yard for 40 seconds.

Example 2

A lacquer is prepared from the following ingredients.

| | Parts by weight |
|---|---|
| Interpolymer of methacrylamide 20%, n-butyl methacrylate 80% | 1.0 |
| Xylene/isobutanol (equal parts by volume) | 4.0 |
| Dimethylol urea dimethyl ether | 0.17 |
| m-Benzene disulphonic acid | Trace |

This lacquer was applied to the surface of a sheet material previously prepared in known manner by coating a fabric with a paste-like composition containing polyvinyl chloride and a plasticiser therefor. The lacquer is dried by subjecting the sheet material to a temperature of 100° C. for 5 minutes and is then subjected to a source of radiant heat as described in Example 1.

I claim:

1. Flexible shaped articles comprising a gelatinized polyvinylchloride composition and a resinous interpolymer of a methacrylate ester of a saturated aliphatic alcohol and methacrylamide.

2. The process which comprises shaping gelatinized polyvinylchloride and an interpolymer of a methacrylic ester of a saturated aliphatic alcohol and methacrylamide.

3. The product of claim 1 in which the interpolymer contains from 2 to 50% of the amide.

4. The process of claim 2 in which the interpolymer contains from 2 to 50% of the amide.

STANLEY CHARLES FROWDE.

REFERENCES CITED

The following references are of record in the file of this patent:

UNITED STATES PATENTS

| Number | Name | Date |
|---|---|---|
| 2,205,355 | Grimm et al. | June 18, 1940 |
| 2,302,557 | Langkammerer | Nov. 17, 1942 |
| 2,310,132 | Underdahl | Feb. 2, 1943 |
| 2,336,792 | Langkammerer | Dec. 14, 1943 |

FOREIGN PATENTS

| Number | Country | Date |
|---|---|---|
| 822,263 | France | Dec. 24, 1937 |
| 116,314 | Australia | Jan. 14, 1943 |